United States Patent
Dyko et al.

(10) Patent No.: US 7,909,146 B2
(45) Date of Patent: Mar. 22, 2011

(54) BRAKE HOUSING AND TORQUE TUBE ASSEMBLY

(75) Inventors: Mark P. Dyko, Copley, OH (US); Van N. Eidom, Akron, OH (US)

(73) Assignee: Meggitt Aircraft Braking Systems, Akron, OH (US)

( * ) Notice: Subject to any disclaimer, the term of this patent is extended or adjusted under 35 U.S.C. 154(b) by 994 days.

(21) Appl. No.: 11/076,314

(22) Filed: Mar. 10, 2005

(65) Prior Publication Data

US 2006/0201754 A1 Sep. 14, 2006

(51) Int. Cl.
*F16D 55/36* (2006.01)
(52) U.S. Cl. .................................................. 188/71.5
(58) Field of Classification Search ............. 188/71.5, 188/73.2, 71.4
See application file for complete search history.

(56) References Cited

U.S. PATENT DOCUMENTS

| 5,494,138 A | * | 2/1996 | Scelsi et al. | 188/18 A |
| 5,908,091 A | * | 6/1999 | Berwanger | 188/71.5 |

FOREIGN PATENT DOCUMENTS

EP 0398 274 * 11/1990

* cited by examiner

*Primary Examiner* — Melanie Torres Williams
(74) *Attorney, Agent, or Firm* — Renner, Kenner, Greive, Bobak, Taylor & Weber

(57) ABSTRACT

A brake housing and torque tube assembly for a vehicle such as an aircraft is presented. The interface between the brake housing and the torque tube is accommodated by a thermal composite material insulator that is located adjacent the brake housing and a metallic spacer adjacent the torque tube. The metallic spacer provides stiffness to the joint therebetween to prevent fatigue failure of the bolts interconnecting the brake housing and the torque tube. The metallic spacer also protects the insulator ring from sharp edges and small bearing area that are typically present at the ends of the torque tube.

12 Claims, 1 Drawing Sheet

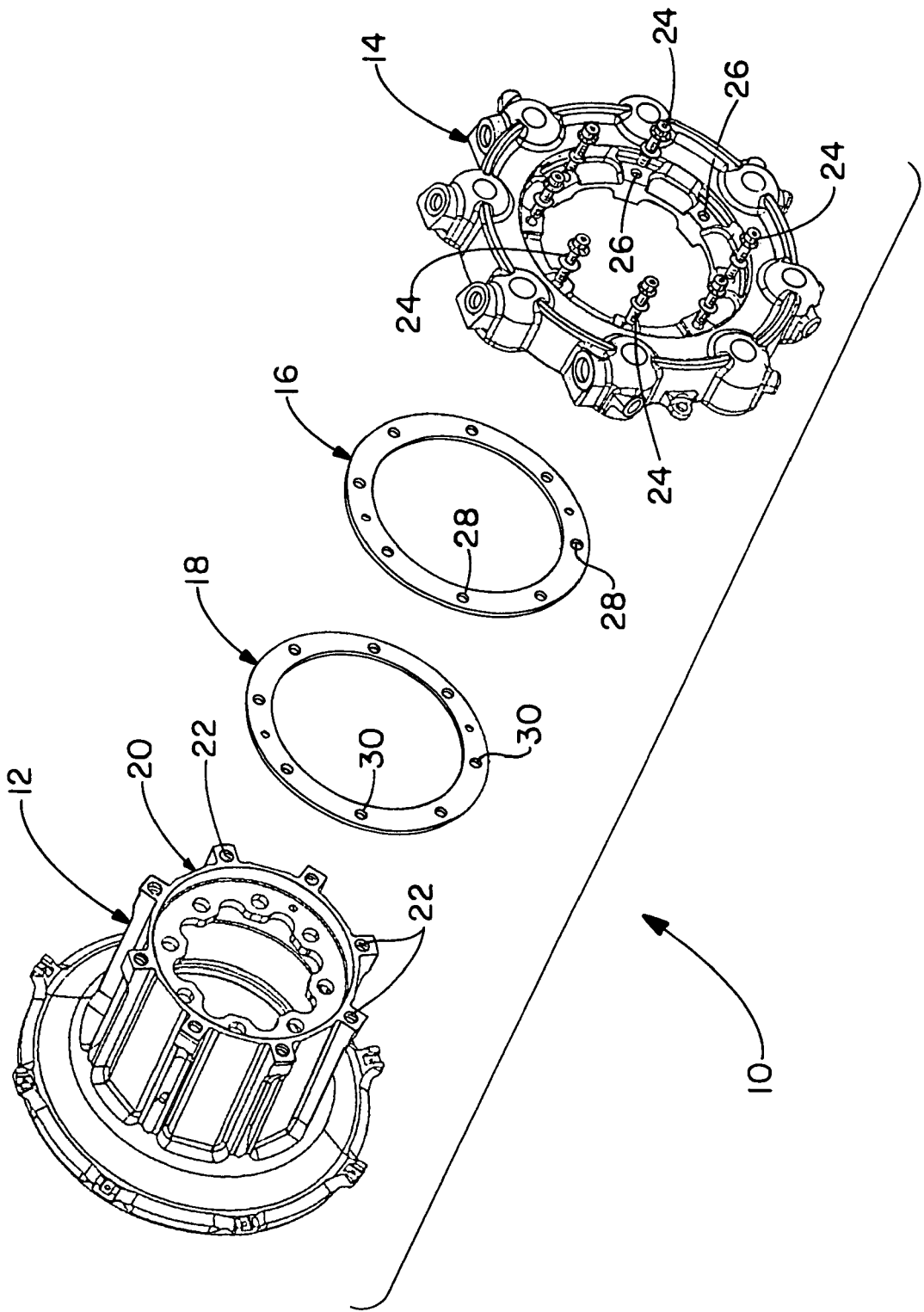

BRAKE HOUSING AND TORQUE TUBE ASSEMBLY

TECHNICAL FIELD

The invention herein resides in the art of vehicle brakes and, more particularly, to a brake housing and torque tube assembly for such brakes. More particularly, the invention relates to a brake housing and torque tube assembly as would be employed in an aircraft. Specifically, the invention relates to the interface between a brake housing and torque tube, providing both thermal insulation and mechanical relief.

BACKGROUND ART

Those skilled in the art of vehicle brakes and, more particularly, aircraft brakes are familiar with the fact that a torque tube is maintained in juxtaposition to a braked wheel for receipt of a brake disk stack having alternating interleaved stator and rotor disks which are engaged and disengaged by a brake assembly that includes a brake housing secured to the torque tube. In the prior art, a composite material thermal insulator has been interposed between the brake housing and the torque tube, which are held together by multiple bolts. The bolts are in tension and the housing, insulator and torque tube are compressed slightly from the bolt preload. When the brakes are actuated, the brake housing pistons press against the brake disk stack, placing additional loads on these components. Bolt tension increases and compression of the housing, insulator and torque tube decreases. As the brakes are repeatedly applied and released, fluctuating stresses arise in the components. If the magnitude and number of fluctuations are sufficiently high, fatigue failure can occur. This is due, in large part, to the relatively low stiffness of the insulator composite material. Further, in the prior art structures, the insulator directly contacted the torque tube, which gave rise to the possibility of damage to the insulator due to excessive bearing and sheer stress from the torque tube.

The prior art is devoid of an interface between the brake housing and torque tube that stiffens the joint to minimize the likelihood of failure by fatigue, while maintaining the desired thermal insulation characteristics between the brake housing and torque tube, and while further precluding the sharp edges and small bearing area that characterize the mating face of the torque tube from damaging the material interposed at the interface.

DISCLOSURE OF INVENTION

In light of the foregoing, a first aspect of the invention is the provision of a brake housing and torque tube assembly joined together by a stiff joint sufficient to minimize any likelihood of failure by fatigue.

Another aspect of the invention is the provision of a brake housing and torque tube assembly which is characterized by sufficient hardness to preclude damage from compressive engagement with the torque tube.

Still a further aspect of the invention is the provision of a brake housing and torque tube assembly which provides for thermal insulation between the torque tube and brake housing, while providing a stiff joint not susceptible to failure by fatigue, and a hard interface not given to damage by compressive engagement with the torque tube.

Yet a further aspect of the invention is the provision of a brake housing and torque tube assembly which is readily adaptable for implementation with presently existing brake units.

The foregoing and other aspects of the invention which will become apparent as the detailed description proceeds are achieved by a vehicle brake assembly, comprising: a torque tube; a brake housing; an insulator interposed between said torque tube and brake housing; a spacer interposed between said torque tube and brake housing; and a plurality of bolts securing said brake housing to said torque tube and sandwiching said insulator and spacer therebetween.

Other aspects of the invention are attained by a vehicle brake assembly, comprising: a torque tube; a brake housing; an insulator interposed between said torque tube and said brake housing; a metal ring interposed between said torque tube and said brake housing, and adjacent said insulator, said metallic ring having a characteristic stiffness exceeding that of said insulators and a plurality of bolts securing said brake housing to said torque tube with said insulator and metallic rings sandwiched therebetween.

Yet additional aspects of the invention are attained by a vehicle brake assembly, comprising: a torque tube characterized by sharp edges and small bearing area at an end surface thereof; a brake housing; a metallic ring interposed between said brake housing and said torque tube and adjacent said end surface of said torque tube having said sharp edges and small bearing area; an insulator ring interposed between said torque tube and said brake housing, and adjacent said brake housing; a plurality of bolts forcefully securing said brake housing to said torque tube and sandwiching said metallic ring and insulator ring therebetween; and wherein said metallic ring has a characteristic stiffness exceeding a characteristic stiffness of said insulator ring.

DESCRIPTION OF DRAWING

For a complete understanding of the structure and techniques of the invention, reference should be made to the following detailed description and accompanying drawing wherein an exploded view of the brake housing and torque tube assembly of the invention is shown.

BEST MODE FOR CARRYING OUT THE INVENTION

Referring now to the drawing, it can be seen that a brake assembly of the type typically used on an aircraft is designated generally by the numeral 10. The brake assembly 10 is shown without the brake disk stack, or heat stack, that would typically be interposed between the rotating wheel of the aircraft and the stationary torque tube. The brake assembly 10 is shown as including a torque tube 12 and a brake housing 14 with an insulator ring 16 interposed therebetween. Indeed, the prior art typically included such a structure, the insulator ring 16 being the only structure for interfacing the torque tube 12 with the brake housing 14. The insulator ring 16 is a thermal insulator, serving to inhibit the transfer of heat from the torque tube 12 to the brake housing 14 and associated hydraulic pistons and the like. As presented above, such a structure was given to risk of bolt fatigue failure and insulator ring damage resulting from sharp edges and small bearing area characterizing the edge of the torque tube 12 engaging the insulator 16. Accordingly, the invention seeks to maintain thermal insulation, reduce the likelihood of fatigue failure, and prevent damage to the interface material.

The magnitude of fluctuating bolt stress is a function of the applied load, the stiffness of the components, the bolt preload, and the area of the bolt. In the case of a brake assembly, the applied load is the force of brake application. The greater the stiffness at the bolted joint, the lower the stresses in the bolt.

Accordingly, the invention seeks to replace the single insulator ring 16 of a composite material given to damage by sharp edges and small bearing area, with the combination of a composite material insulator ring 16 and a metallic spacer ring 18. The metallic spacer ring 18 is fabricated to the same dimensions as the composite material insulator ring 16, with the spacer ring 18 being interposed between the insulator ring 16 and the torque tube 12, as shown. In the preferred embodiment of the invention, the summation of the thicknesses of the rings 16, 18 is equal to the thickness of the insulator ring 16 as used in the prior art. In its simplest form, the insulator ring 16 is reduced to half its thickness, with the metallic ring 18 being of the same thickness. Depending upon the desired amount of structural and thermal protection, the thicknesses of the rings 16, 18 can be varied. For a given total insulator and spacer thickness, increasing the thickness of the spacer for greater structural benefits will reduce the thickness of the insulator resulting in less thermal protection for the brake housing. Conversely, reducing the thickness of the spacer will allow use of the thicker insulator for increased thermal protection of the brake housing.

It has been found that the stiffness of the half-thickness metallic spacer is much greater than the composite material it replaces, owing to a much high modulus of elasticity compared to the composite material. Additionally, the stiffness of the half-thickness composite insulator is twice that of the prior full-thickness insulator. Accordingly, the joint stiffness is higher and the alternating and mean bolt stresses are lower. With these reduced stresses, the risk of bolt fatigue is reduced. Moreover, with the spacer ring 18 being of metallic construction, it is not given to damage by the sharp edges and small bearing area of the torque tube 12 by which it is engaged.

As shown in the drawing, the torque tube 12 is characterized by a ring flange 20 having machined threaded bores 22 therein. The flange 20 is characterized by sharp edges and small bearing area about the inner and outer peripheries thereof, as well as at the interface of the bores 22 and the flange 20. It is these sharp edges and small bearing area that are defeated by the metallic nature of the spacer 18. The threaded bores 22 are adapted to receive bolts 24, which pass through apertures 26 in the brake housing 14 as well as corresponding apertures 28 and 30 in the insulator ring 16 and spacer ring 18, respectively. As the bolts 24 are tightened into the threaded bores 22, the rings 16, 18 are sandwiched between the brake housing 14 and torque tube 12, and bolts 24 are preloaded with a tension that places the elements 12-18 in compression.

By employing the combination of an insulator ring 16 and a metallic spacer 18, having a combined thickness equal to the thickness of the original insulator ring, existing designs of brake assemblies may be retrofitted with the structure of the invention. With the metallic ring having a characteristic stiffness greater than the stiffness of the insulator, and a modulus of elasticity greater than that of the insulator, and with the metallic ring positioned immediately adjacent the torque tube, the benefits of the invention of reduced fatigue failure and reduced damage to the insulator ring may be enjoyed while achieving the desired thermal insulation.

Thus it can be seen that the objects of the invention are satisfied by the structure presented above. While in accordance with the patent statutes only the best mode and preferred embodiment of the invention has been presented and described in detail, the invention is not limited thereto or thereby. Accordingly, for an appreciation of the scope and breadth of the invention reference should be made to the following claims.

What is claimed is:

1. A vehicle brake assembly, comprising:
   a torque tube;
   a brake housing;
   an insulator interposed between said torque tube and brake housing;
   a spacer interposed between said torque tube and brake housing; and
   a plurality of bolts securing said brake housing to said torque tube and sandwiching said insulator and spacer therebetween.

2. The brake assembly according to claim 1, wherein said spacer comprises a metallic ring.

3. The brake assembly according to claim 2, wherein said metallic ring has a characteristic stiffness greater than a characteristic stiffness of said insulator.

4. The brake assembly according to claim 3, wherein said metallic ring has a higher modulus of elasticity than said insulator.

5. The brake assembly according to claim 4, wherein said metallic ring is positioned immediately adjacent said torque tube.

6. The brake assembly according to claim 5, wherein said insulator is positioned immediately between and adjacent said metallic ring and said brake housing.

7. A vehicle brake assembly, comprising:
   a torque tube;
   a brake housing;
   an insulator interposed between said torque tube and said brake housing;
   a metal ring interposed between said torque tube and said brake housing, and adjacent said insulator, said metallic ring having a characteristic stiffness exceeding that of said insulator; and
   a plurality of bolts securing said brake housing to said torque tube with said insulator and metallic rings sandwiched therebetween.

8. The brake assembly according to claim 7, wherein said metallic ring has a modulus of elasticity exceeding a modulus of elasticity of said insulator.

9. The brake assembly according to claim 8, wherein said torque tube is characterized by sharp surfaces and small bearing area adjacent said sandwiched metallic ring and insulator.

10. The brake assembly according to claim 9, wherein said torque tube has a plurality of threaded bores about a periphery thereof.

11. The brake assembly according to claim 10, wherein said metallic ring is positioned immediately adjacent said torque tube and said insulator is positioned immediately adjacent said brake housing.

12. A vehicle brake assembly, comprising:
   a torque tube characterized by sharp edges and small bearing area at an end surface thereof;
   a brake housing; a metallic ring interposed between said brake housing and said torque tube and adjacent said end surface of said torque tube having said sharp edges and small bearing area;
   an insulator ring interposed between said torque tube and said brake housing, and adjacent said brake housing;
   a plurality of bolts forcefully securing said brake housing to said torque tube and sandwiching said metallic ring and insulator ring therebetween; and
   wherein said metallic ring has a characteristic stiffness exceeding a characteristic stiffness of said insulator ring.

* * * * *